(12) United States Patent
Yamaguchi et al.

(10) Patent No.: US 6,380,651 B1
(45) Date of Patent: Apr. 30, 2002

(54) BRUSHLESS MOTOR HAVING RESIN BEARING

(75) Inventors: Tadao Yamaguchi; Naohisa Koyanagi; Akihisa Inoue, all of Isesaki (JP)

(73) Assignee: Tokyo Parts Industrial Co., Ltd., Isesaki (JP)

( * ) Notice: Subject to any disclaimer, the term of this patent is extended or adjusted under 35 U.S.C. 154(b) by 0 days.

(21) Appl. No.: 09/563,849

(22) Filed: May 4, 2000

(51) Int. Cl.[7] ................................................. H02K 7/08
(52) U.S. Cl. ..................... 310/90; 310/67 R; 310/75 R; 384/100
(58) Field of Search ........................ 310/90, 254, 261, 310/67 R, 156.26, 75 R; 384/112, 115, 100

(56) References Cited

U.S. PATENT DOCUMENTS 5,357,163 A  * 10/1994  Minakuchi et al. ............ 310/90
5,550,414 A  *  8/1996  Sakashita et al. ......... 310/67 R
5,822,846 A  * 10/1998  Moritan et al. ................ 310/90
5,932,946 A  *  8/1999  Miyasaka et al. ............. 310/90

FOREIGN PATENT DOCUMENTS

JP   10-299763   * 11/1998   ............ H02K/7/08
JP   2000-60063  *  2/2000   ............ H02K/7/08

OTHER PUBLICATIONS

JPO translation of JP 2000–60063 to Asai.*

* cited by examiner

*Primary Examiner*—Burton S. Mullins
(74) *Attorney, Agent, or Firm*—Leydig, Voit, & Mayer, Ltd.

(57) ABSTRACT

A brushless motor having a resin bearing including a rotor with an integral output device at one side of a rotor case and a magnet at the other side, a shaft supporting the rotor, a resin bearing supporting the shaft for rotating, a stator base incorporating the resin bearing, a stator for driving the rotor, and an oil containing portion in the resin bearing. The oil containing portion includes grooves, a concave portion, and an oil barrier device located at the resin bearing, so the number of parts as well as the cost is reduced and a simple structure prevents the oil from leaking.

8 Claims, 4 Drawing Sheets

BRUSHLESS MOTOR HAVING RESIN BEARING

BACKGROUND OF THE INVENTION

1. Field of the Invention

The present invention relates to a brushless motor having a resin bearing so that the torque output of a rotor suitable for driving a pickup of a portable mini disk apparatus can be transferred through a transfer device such as a gear.

2. Description of the Related Art

Referring to FIG. 5, in a conventional geared motor for driving a pickup of a portable mini disk apparatus, a pinion P is installed at a rotary output shaft S of a flat type brushless motor M as a transfer device to transfer the increased torque output. Also, although not shown, a pulley is installed instead of the pinion P for belt deceleration. In the motor having the above structure, a bearing holder H formed of brass is installed at a stator base B by caulking and the shaft S is installed for rotating through a sintered oilless bearing G.

In the above structure, however, due to the increasing cost of the brass bearing holder H and the sintered oilless bearing G, a resin bearing outsert-molded at the stator base is being adopted. However, as this resin bearing is not porous, maintaining oil is difficult and the oil adhering to the surface the bearing can easily leak.

SUMMARY OF THE INVENTION

To solve the above problems, it is an objective of the present invention to provide a brushless motor having a resin bearing in which the leakage of oil can be prevented with a simple structure without using a washer such as an oil stop so that the number of parts as well as the cost is reduced.

Accordingly, to achieve the above objective, there is provided a brushless motor having a resin bearing which comprises a rotor in which an output device is integrally formed at one side of a rotor case and a magnet is disposed at the other side thereof, a shaft for supporting the rotor, a resin bearing for supporting the shaft to be capable of rotating, a stator base incorporating the resin bearing, a stator for driving the rotor, and an oil containing portion formed at the resin bearing.

It is preferred in the present invention that at least a part of the oil containing portion is a plurality of grooves which are not consecutive and are formed at the inner surface of the resin bearing so that a lubricant is prevented from leaking in a direction in which a lateral pressure occurs during rotation.

Also, it is preferred in the present invention that at least a part of the oil containing portion is a concave portion disposed at a position corresponding to the bottom end of the shaft.

Also, it is preferred in the present invention that at least a part of the oil containing portion is an oil barrier device provided at an open end of the resin bearing.

Also, it is preferred in the present invention that the oil barrier device is a fluorine-based pigment coated around the shaft of the rotor case.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
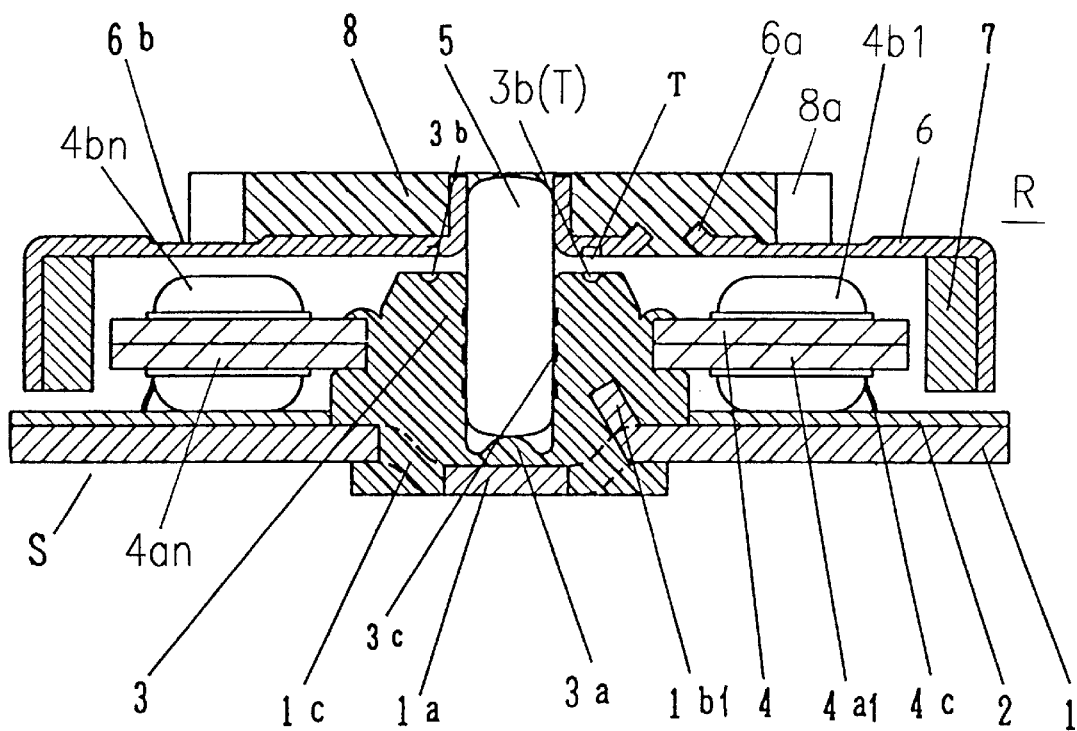
FIG. 1 is a sectional view showing the structure of a diametric direction gap core geared motor as a first preferred embodiment of a brushless motor having a resin bearing of the present invention.

In FIG. 1, reference numeral 1 denotes a stator base formed of a relatively thin stainless plate, and a circuit board 2 formed of a glass cross epoxy plate is disposed on the upper surface of the stator base. A bridge portion 1a is located at the central portion of the stator base 1 and three support pieces 1b1, 1b2 and 1b3 (1b2 and 1b3 are not shown) are located around the bridge portion 1a at about the same interval. A bag type resin bearing 3 is integrally molded with the support pieces 1b1, 1b2 and 1b3, and is a low friction resin. A stator core 4 made by winding armature coils 4b1, . . . , 4bn around a plurality of protruding poles 4a1, . . . , 4an, is fixedly installed at the outer circumferential surface of the resin bearing 3 by adhesion or welding. An end portion 4c of each of the armature coils 4b1, . . . , 4bn is connected to a predetermined pattern of the circuit board 2 by soldering to thus form a stator S.

Figure 2:
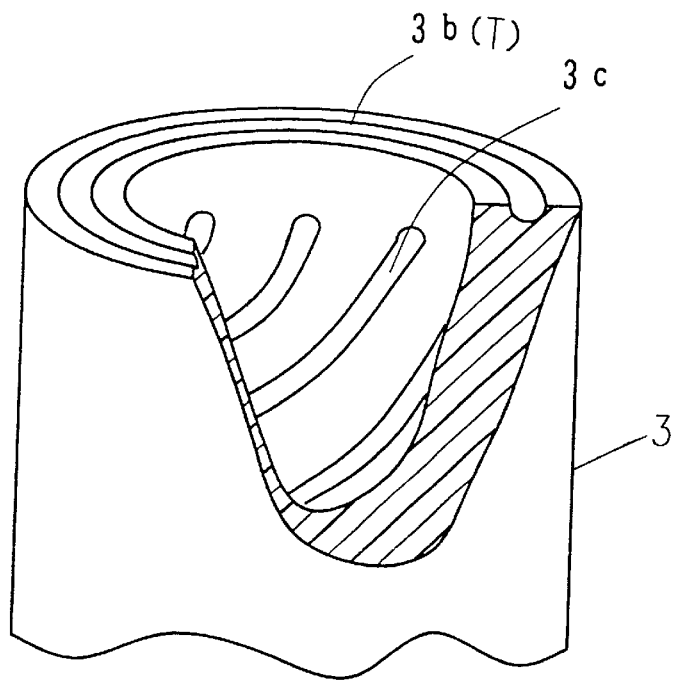
FIG. 2 is a partially cut-away perspective view of part of a resin bearing of the motor shown in FIG. 1.

The inner diameter of the resin bearing 3 provides a clearance between the inner circumferential surface of the resin bearing 3 and the outer circumferential surface of a shaft 5 which will be described later. Also, a support portion 3a having a raised shape is located only at the center of a lower portion of the resin bearing 3 so that it can contain oil and support the shaft 5 when the bottom surface of the shaft 5 is flat. That is, the recessed portion around the mountain shaped support portion 3a is part of an oil containing portion. Also, as shown in FIG. 2, a ring-shaped groove 3b is formed in an open end surface of the resin bearing 3 and a fluorine-based oil barrier pigment T is applied thereto so that the groove 3b forms part of the oil containing portion. Also, a plurality of the grooves 3b may be provided coaxially. Further, a plurality of very shallow grooves 3c are inclined at the surface of the inner wall of the resin bearing 3 receiving lateral pressure by the shaft 5 so that oil does not ascend with respect to the direction of rotation. The grooves 3c form part of the oil containing portion to cause uniform pressure to the surface of the inner wall of the resin bearing 3. Also, when the shaft 5 is rotated in both the forward and reverse directions, the grooves 3c are obviously formed at the corresponding surface.

A rotor R includes the shaft 5 directly inserted in the resin bearing 3 for rotating, a rotor case 6 coupled to the resin bearing 3 via the shaft 5 by being installed on and around the shaft 5 by pressing. A rubber magnet 7 has a ring shape and is installed inside the rotor case 6 by bending a plate of the rotor case 6 and fixing with pressure the rubber magnet 7 to the inner surface of the rotor case 6 to face the protruding poles 4a1, . . . , 4an of the stator core 4 through a diametric direction gap. At least one reinforcement support portion 6a for preventing separation is provided at the upper surface of the rotor case 6, and a pinion 8 is integrally formed of polyacetyl resin with the support portion 6a as a transfer device. The rotor case 6 at a gear portion 8a of the pinion 8 has a slightly concaved portion 6b which is formed during a pressing process. When the pinion 8 is integrally formed, a mold is inserted into the concave portion 6b so that an effective length of the gear portion 8a can be secured if the mold is abraded.

Although a pinion is used as a transfer device in the present preferred embodiment, a roller made of soft rubber or a pulley can be used instead.

According to the above preferred embodiment, as the leakage of oil can be prevented in a resin bearing which is not porous, the function as a bearing can be sufficiently performed. Also, the groove 3c is preferably very shallow so that the mold can be easily pulled out of the bearing by applying a force. Further, it is preferable that the oil transferred from the shaft 5 is prevented from dispersing by applying a fluorine-based oil barrier pigment on the inner surface of the rotor case.

Figure 3:
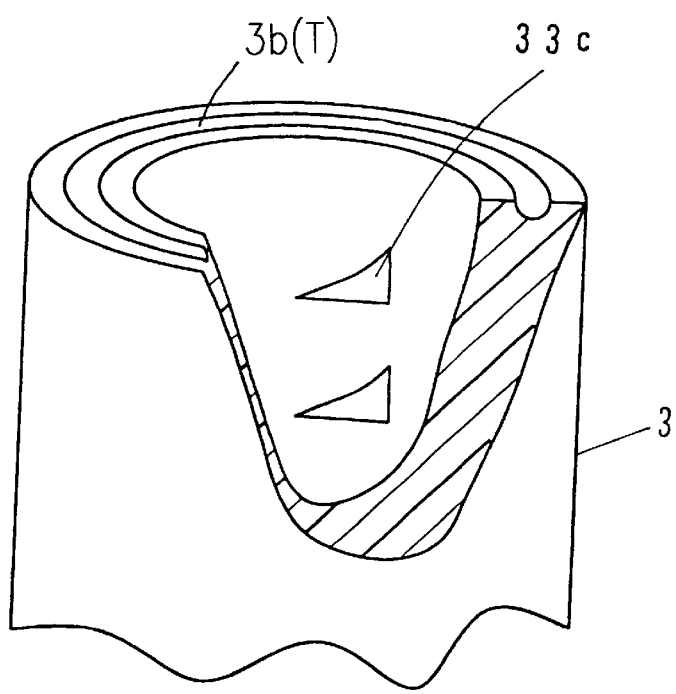
FIG. 3 is a partially cut-away perspective view showing another preferred embodiment the resin bearing shown in FIG. 1.

FIG. 3 shows another preferred embodiment of the resin bearing shown in FIG. 1. Referring to the drawing, a very shallow groove 33c, which serves as part of the oil containing portion, is present instead of the groove 3c, so that the same pressure is generated regardless of the direction of rotation. As the other elements are the same in the above-described embodiment, a description therefor will be omitted.

Although a pinion is used as the transfer device in both embodiments, a worm may be used. Also, although the stator core 4, which has two stacked laminates, is relatively thin, it is obvious that an axially lengthy stator core with tens of stacked laminates can be adopted.

Figure 4:
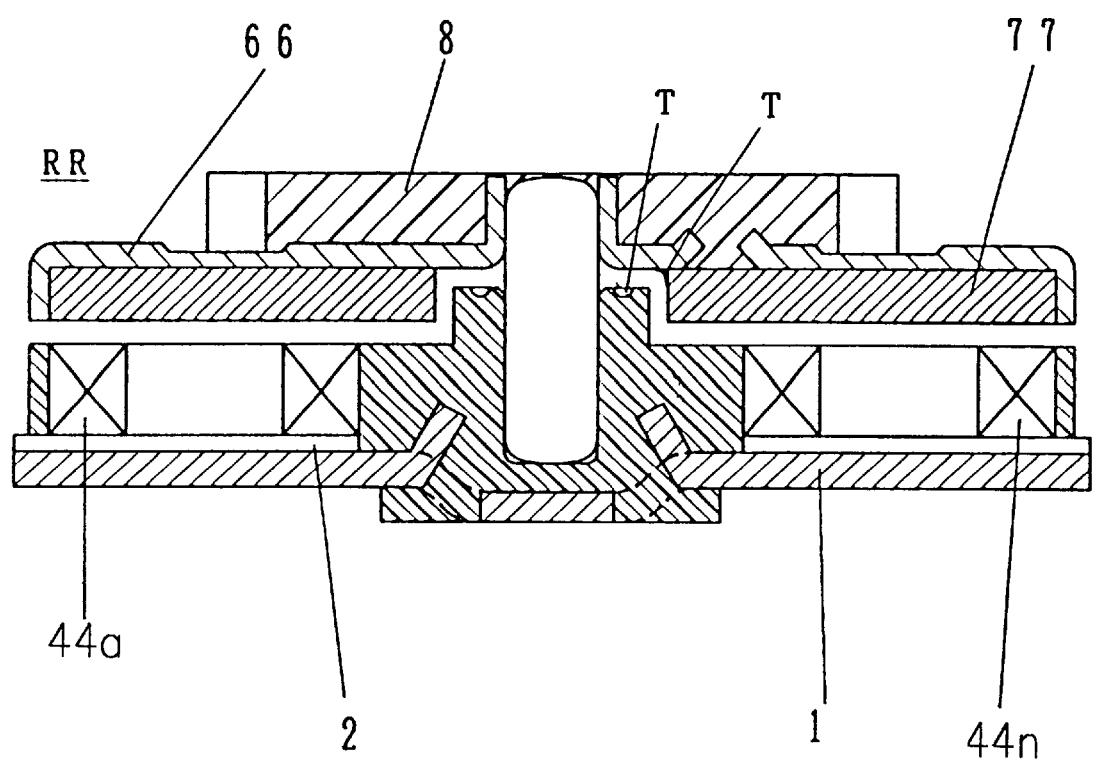
FIG. 4 is a sectional view showing major parts of an axial direction gap slotless geared motor as a third preferred embodiment of a brushless motor having a resin bearing of the present invention.
Figure 5:
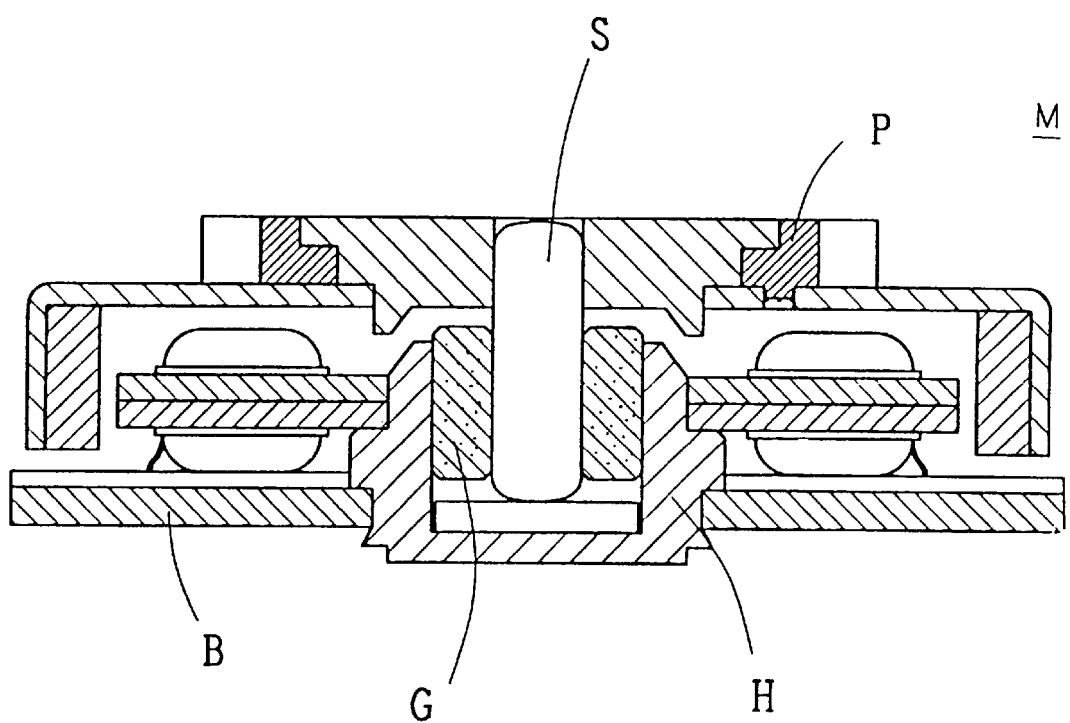
FIG. 5 is a sectional view showing a brushless motor having a conventional transferring device.

As shown in FIG. 4, an axial direction gap slotless geared motor can be used as a third preferred embodiment of a brushless motor having a resin bearing of the present invention. In this case, a neodymium-based magnet 77 forming a rotor RR has a disk shape and is fixedly installed at the inner surface of a rotor case 66. A plurality of air-core armature coils 44a, . . . , 44n facing the magnet 77 are fixedly installed at the stator base 1 through the circuit board 2 as above. In this case, the fluorine-based oil barrier pigment T preferably coats the inner surface of the rotor case 66 at the inside of the magnet 77, thus forming part of the oil containing portion.

The structure of the pinion 8 as the transfer device is the same as that of the above-described embodiments, a description thereof referenced with the same numbers will be omitted herein.

In the present invention, as the brushless motor having a resin bearing has the above structure, the life span of a motor with a resin bearing is extended.

In detail, in the invention, a bearing which is not porous can be lubricated by the oil containing portion.

According to the invention, leakage of oil through the open end portion of the bearing can be prevented due to the inclined grooves which are not concentric.

According to the invention, since the oil containing portion is formed by a concave portion disposed at the position corresponding to the bottom end of the shaft, the concave portion can contain oil, the bottom end of the shaft can be flat and the central portion of the bearing can have a raised shape, thus reducing the cost of manufacturing the shaft.

According to the invention, as an oil barrier device is provided at the open end portion of the resin bearing, diffusion of the oil can be prevented.

According to the invention, the oil moving along the shaft can be prevented from leaking.

Also, although a shaft rotation motor is described as the preferred embodiment, the bearing may be installed at the rotor side by fixing the shaft.

It is noted that the present invention is not limited to the preferred embodiment described above, and it is apparent that variations and modifications by those skilled in the art can be effected within the spirit and scope of the present invention defined in the appended claims.

What is claimed is:

1. A brushless motor having a resin bearing comprising:
   a rotor including
      a rotor case having opposed outside and inside surfaces and a support protruding from the outside surface and including an opening in the rotor case;
      an output transfer device integral with the support and disposed partially within the opening, at a first side of the rotor case; and
      a magnet disposed at a second side of the rotor case;
   a shaft supporting the rotor;
   a resin bearing supporting the shaft for rotating and having an oil-containing portion;
   a generally planar stator base having opposed inside and outside surfaces, a hole, and a bearing support oblique to the first surface and embedded in the resin bearing;
   a bridge, wherein the resin bearing is upstanding from the inside surface of the stator base and is reinforced by the bearing support and the bridge, the bridge being incorporated in a part of the resin bearing opposite the shaft that protrudes from the hole and the outside surface of the stator base; and
   a stator for driving the rotor, the stator being located at the inside surface of the stator base, farther from the shaft than the resin bearing.

2. The brushless motor as claimed in claim 1, wherein the oil-containing portion includes a plurality of discontinuous concavities in an interior surface of the resin bearing adjacent the shaft and intermediate the inside surface of the rotor case and the inside surface of the stator base so that a lubricant is prevented from leaking along the shaft during rotation of the shaft.

3. The brushless motor as claimed in claim 2, including an oil barrier in an end of the resin bearing and comprising a groove concentric with the shaft and an oil barrier pigment coating the groove.

4. The brushless motor as claimed in claim 3, wherein the oil barrier includes a fluorine-based pigment on the inside surface of the rotor case surrounding the shaft.

5. The brushless motor as claimed in claim 1, the oil-containing portion includes a plurality of grooves in an interior surface of the resin bearing adjacent, but not concentric, with the shaft and intermediate the inside surface of the rotor case and the inside surface of the stator base so that a lubricant is prevented from leaking along the shaft during rotation of the shaft.

6. The brushless motor as claimed in claim 5, wherein the oil barrier includes a fluorine-based pigment on the inside surface of the rotor case surrounding the shaft.

7. The brushless motor as claimed in claim 5, including an oil barrier in an end of the resin bearing and comprising a groove concentric with the shaft and an oil barrier pigment coating the groove.

8. The brushless motor as claimed in claim 1, wherein the outside surface of the rotor case includes a concave portion in which a part of the output transfer device is disposed.

* * * * *